United States Patent
Wu (10) Patent No.: US 9,676,282 B2
(45) Date of Patent: Jun. 13, 2017

(54) RANGE-EXTENDING, CHARGING, AND DRIVING APPARATUS FOR AN ELECTRIC VEHICLE

(71) Applicant: Chen-Yang Wu, Taipei (TW)

(72) Inventor: Chen-Yang Wu, Taipei (TW)

(73) Assignee: Chen-Yang Wu, Taipei (TW)

( * ) Notice: Subject to any disclaimer, the term of this patent is extended or adjusted under 35 U.S.C. 154(b) by 0 days.

(21) Appl. No.: 14/884,946

(22) Filed: Oct. 16, 2015

(65) Prior Publication Data
US 2016/0264009 A1    Sep. 15, 2016

(30) Foreign Application Priority Data

Mar. 10, 2015  (TW) ............................. 104203502 U (51) Int. Cl.
| | |
|---|---|
| B60L 11/18 | (2006.01) |
| H02K 7/116 | (2006.01) |
| H02K 7/14 | (2006.01) |
| H02K 7/18 | (2006.01) |
| B60K 17/04 | (2006.01) |

(52) U.S. Cl.
CPC ....... B60L 11/1809 (2013.01); B60L 11/1851 (2013.01); B60L 11/1887 (2013.01); H02K 7/116 (2013.01); H02K 7/14 (2013.01); *B60K 17/046* (2013.01); *H02K 7/1846* (2013.01); *Y02T 10/641* (2013.01); *Y10S 74/09* (2013.01)

(58) Field of Classification Search
CPC ....... B60L 11/1809; H02K 7/116; H02K 7/18; H02K 7/1846
See application file for complete search history.

(56) References Cited

U.S. PATENT DOCUMENTS

| | | | | |
|---|---|---|---|---|
| 5,382,854 | A  * | 1/1995 | Kawamoto  .......... | B60K 7/0007 180/65.6 |
| 8,983,723 | B2 * | 3/2015 | Katsuyama ......... | B60T 8/17555 180/6.5 |
| 9,331,546 | B2 * | 5/2016 | Kim ......................... | H02K 7/14 |
| 2007/0181357 | A1* | 8/2007 | Saito .................... | B60K 7/0007 180/65.51 |
| 2009/0093931 | A1* | 4/2009 | Mizutani .............. | B60K 7/0007 701/42 |
| 2009/0156347 | A1* | 6/2009 | Suzuki ................. | B60K 17/046 475/178 |
| 2015/0084397 | A1* | 3/2015 | Kudo ..................... | B60B 27/02 301/6.5 |

* cited by examiner

*Primary Examiner* — Erez Gurari
(74) *Attorney, Agent, or Firm* — WPAT, PC; Justin King (57) ABSTRACT

Nowadays people attempt to replace petrochemical engine vehicles by electric vehicles. However, up to now this attempt has not been successful yet for the insufficiency of safety, cruising range and convenience. When the electricity of battery is used up, the electric vehicle has to stop running and wait for charging and looking for charging stations, always make consumers give up the idea of buying electric vehicles. We have creatively design a range-extending, charging, and driving apparatus for an electric vehicle. It makes use of the clever configuration of wheel motor and planetary gear assembly, which can increase the cruising range, torque and speed of electric vehicle, and conduct charging while driving, and provides the auxiliary power fuel cell with the fuel of oxygen. Here electric vehicles cover all kinds of electric vehicles.

16 Claims, 7 Drawing Sheets

RANGE-EXTENDING, CHARGING, AND DRIVING APPARATUS FOR AN ELECTRIC VEHICLE

CROSS-REFERENCES TO RELATED APPLICATION

This non-provisional application claims priority under 35 U.S.C. §119(a) on Patent Application No. 104203502 filed in Taiwan, R.O.C. on Mar. 10, 2015, the entire contents of which are hereby incorporated by reference.

BACKGROUND

Technical Field

The invention relates to a driving device for an electric vehicle, and particularly relating to a range-extending, charging, and driving apparatus for an electric vehicle, wherein the apparatus is capable of extending the cruising range, enhancing the torque, speed of the electric vehicle, providing fuel (oxygen), and charging both battery and fuel cell of the electric vehicle, and the electric vehicle can be, for example: a pure battery-powered electric vehicle, hybrid electric vehicle (HEY), a fuel cell electric vehicle (FCEV), hybrid battery and fuel-cell electric vehicle, range-extended electric vehicle such as a range-extended electric vehicle with an internal combustion engine and a generator, fuel-cell range-extended electric vehicle, and electric motorcycle.

Related Art

Nowadays people attempt to replace petrochemical engine vehicles by electric vehicles. However, up to now this attempt has not been successful yet for the insufficiency of safety, cruising range and convenience.

Electric vehicles gain much more attention as the problem of environmental pollution caused by traditional fuel vehicles and the rising of the fuel oil price are concerned. Reduced environmental pollution would be caused by the electric vehicles, which are driven by drive motors and employ batteries as power sources, without the restriction of using engines.

However, the problems of the pure electric vehicles in general have deterred the consumers. One problem is that the user has to wait for a period time for the charging of the battery of the electric vehicle when the electric vehicle must stop working due to the battery running out of energy. Another problem is that the user has to look for a nearest one from the charging stations, which are not as widely distributed as the gas stations. Thus, it is desirable for the industry to extend operation time of electric power, to enhance performance of torque and acceleration of the electric vehicles under normal operation.

SUMMARY

According to an object of the invention, a range-extending, charging, and driving apparatus for an electric vehicle is provided. As exemplified by the following embodiments, the apparatus can be employed to extend the cruising range of and charging an electric vehicle, or can be employed to extend the cruising range, to enhance the torque, speed of an electric vehicle, and to provide fuel (e.g., oxygen) to a full cell. The electric vehicles for the invention can cover different kinds of electric vehicles: pure battery-powered electric vehicles, hybrid electric vehicles (HEV), fuel cell electric vehicles (FCEV), hybrid battery and fuel-cell electric vehicles, range-extended electric vehicles such as range-extending electric vehicles with an internal combustion engine and a generator, fuel-cell range-extending electric vehicles, and electric motorcycles.

The invention is directed to a range-extending, charging, and driving apparatus for an electric vehicle. The apparatus comprises: a planetary gear assembly and a wheel motor. The planetary gear assembly is connected to at least one wheel set of a plurality of wheels of the electric vehicle, and comprises at least one planetary gear, a planet carrier unit, a ring gear, and a sun gear unit. The wheel motor, having an outer side connected to the planetary gear assembly, is employed for driving the planetary gear assembly and at least one wheel set that is connected to the planetary gear assembly. When a main battery that is connected to a circuit of the wheel motor does not provide electric power, the wheel motor, which does not drive the planetary gear assembly, will be driven by the idle wheel(s) and the planetary gear assembly so as to generate electric power, and charge the main battery. In addition, the range-extending, charging, and driving apparatus can further comprise: an air compressor, connected to an inner side of the wheel motor, when the wheel motor does work or reversely generates electric power, the air compressor is driven by the wheel motor to compress air, and the compressed air, utilized as fuel, is provided to a fuel cell which can generate electric power to charge the main battery. In this way, the cruising range of an electric vehicle can be extended; the torque, speed of the electric vehicle can be enhanced; the electric vehicle can be charged; and fuel (e.g., oxygen) can be provided to a full cell.

According to a first embodiment of the invention, a range-extending, charging, and driving apparatus for an electric vehicle is provided. The apparatus comprises: a planetary gear assembly and a wheel motor. The planetary gear assembly comprises at least one planetary gear, a planet carrier unit, a ring gear, and a sun gear unit. The wheel motor, connected the planetary gear assembly correspondingly, is employed for driving the planetary gear assembly and a wheel set, connected to the planetary gear assembly, of a plurality of wheels of the electric vehicle. The wheel motor, further connected to a main battery, is employed for charging the main battery when the wheel motor in reverse generates electric power. When the wheel motor is connected to and drives the planetary gear assembly, the wheel motor does work on the planetary gear assembly, the planetary gear assembly drives the wheel set to turn. When the wheel motor is connected to but does not drive the planetary gear assembly, the wheel set, which idles, reversely drives the planetary gear assembly, and the planetary gear assembly reversely drives the wheel motor to reversely generate electric power so as to charge the main battery.

In an embodiment, the range-extending, charging, and driving apparatus comprises a plurality of the planetary gear assemblies, the planetary gear assembles are configured with at least the wheel set of the wheels and the wheel motor.

In an embodiment, the at least one planetary gear indicates a plurality of planetary gears, and there is a spacing among adjacent ones of the planetary gears.

In an embodiment, the at least one planetary gear indicates a plurality of planetary gear arrays, there is a spacing among adjacent ones of the planetary gear arrays, the planetary gears in each of the planetary gear arrays are engaged.

In some embodiments below, the planet carrier unit comprises a planet carrier and a planet carrier shaft, the sun gear unit comprises a sun gear and a sun gear shaft.

In an embodiment, when the wheel motor is connected to and drives the sun gear shaft, the sun gear is then connected to and drives the planet carrier, and the planet carrier shaft is then connected to and drives the wheel set, the sun gear is as an input, the planet carrier is as an output, and the ring gear is held, providing a large speed reduction in same direction at the wheel set to result in a torque increase at the wheel set.

In the embodiment of achieving torque increase at the wheel set by providing a large speed reduction in same direction at the wheel, the wheel set has at least one front wheel of the electric vehicle, or the wheel set has at least one rear wheel of the electric vehicle. The embodiment of achieving a torque increase can be further applied to embodiments of the range-extending, charging, and driving apparatus comprising a plurality of the planetary gear assemblies and a plurality of the wheel motors, wherein one of the wheel motors is configured to drive one of the planetary gear assemblies and a left wheel set connected thereto; another of the wheel motor is configured to drive another of the planetary gear assemblies and a right wheel set connected thereto, the left wheel set and the right wheel set are front wheels of the electric vehicle, or the left wheel set and the right wheel set are rear wheels of the electric vehicle.

In an embodiment, when the wheel motor is connected to and drives the planet carrier shaft, the planet carrier is then connected to and drives the sun gear, the sun gear shaft is then connected to and drives the wheel set, the planet carrier is as an input, the sun gear is as an output, and the ring gear is held, providing a large speed increase in same direction at the wheel set to enhance speed of the electric vehicle.

In the embodiment of enhancing speed of the electric vehicle by providing a large speed increase in same direction at the wheel set, the wheel set has at least one front wheel of the electric vehicle, or the wheel set has at least one rear wheel of the electric vehicle. The embodiment of enhancing speed of the electric vehicle can be further applied to embodiments of the range-extending, charging, and driving apparatus comprises a plurality of the planetary gear assemblies and a plurality of the wheel motors, wherein one of the wheel motors is configured to drive one of the planetary gear assemblies and a left wheel set connected thereto; another of the wheel motor is configured to drive another of the planetary gear assemblies and a right wheel set connected thereto, the left wheel set and the right wheel set are front wheels of the electric vehicle, or the left wheel set and the right wheel set are rear wheels of the electric vehicle.

In an embodiment, when the wheel set idles and the wheel set is connected to and drives the sun gear shaft, the sun gear is then connected to and drives the planet carrier, and the planet carrier shaft is then connected to and drives the wheel motor to generate electric power, the ring gear is held, the sun gear is as an input, and the planet carrier is as an output, making the planetary gear assembly achieve a large speed reduction to charge the main battery.

In the embodiment that the planetary gear assembly achieves a large speed reduction to charge the main battery, the wheel set has at least one front wheel of the electric vehicle, or the wheel set has at least one rear wheel of the electric vehicle. The embodiment of charging the main battery can be further applied to embodiments of the range-extending, charging, and driving apparatus comprises a plurality of the planetary gear assemblies and a plurality of the wheel motors, wherein a left wheel set, which idles, drives one of the planetary gear assemblies and one of the wheel motors connected thereto, so as to charge the main battery; a right wheel set, which idles, drives another of the planetary gear assemblies and another of the wheel motors connected thereto, so as to charge the main battery, the left wheel set and the right wheel set are front wheels of the electric vehicle, or the left wheel set and the right wheel set are rear wheels of the electric vehicle.

In an embodiment, when the wheel set idles and the wheel set is connected to and drives the planet carrier shaft, the planet carrier is then connected to and drives the sun gear, the sun gear shaft is then connected to and drives the wheel motor to generate electric power, the ring gear is held, the planet carrier is as an input, and the sun gear is as an output, making the planetary gear assembly achieve a large speed increase in same direction to charge the main battery.

In the embodiment that the planetary gear assembly achieves a large speed increase in same direction to charge the main battery, the wheel set has at least one front wheel of the electric vehicle, or the wheel set has at least one rear wheel of the electric vehicle. The embodiment of charging the main battery can be further applied to embodiments of the range-extending, charging, and driving apparatus comprises a plurality of the planetary gear assemblies and a plurality of the wheel motors, wherein a left wheel set, which idles, drives one of the planetary gear assemblies and one of the wheel motors connected thereto, so as to charge the main battery; a right wheel set, which idles, drives another of the planetary gear assemblies and another of the wheel motors connected thereto, so as to charge the main battery, the left wheel set and the right wheel set are front wheels of the electric vehicle, or the left wheel set and the right wheel set are rear wheels of the electric vehicle.

According to any one of the embodiments, in a second aspect of the invention, the range-extending, charging, and driving apparatus for an electric vehicle further comprises: an air compressor and an air reservoir. The air compressor is connected to the wheel motor. When the wheel motor does work or reversely generates electric power so as to charge the main battery, the air compressor is driven by the wheel motor to compress air, and the compressed air, utilized as fuel, is provided to a fuel cell, which is capable of being a power source. The fuel cell is coupled to the main battery, and is utilized for charging the main battery. The air reservoir is connected to the air compressor, and is utilized for store the air compressed by the air compressor.

In an embodiment, an outer shaft of the wheel motor is employed for driving the at least one planetary gear of the planetary gear assembly to do work or for being driven by the planetary gear for generation of electric power, an inner shaft of the wheel motor is employed for driving the air compressor, so that the compressed air is used as fuel and provided to the fuel cell.

In an embodiment, the inner shaft of the wheel motor is linked to a crankshaft so as to drive at least one piston of an air cylinder of the air compressor, so that the compressed air is used as fuel and provided to the fuel cell.

Accordingly, the range-extending, charging, and driving apparatus for an electric vehicle, as in different embodiments, can effectively extend the cruising range of an electric vehicle, enhance the torque, speed of the electric vehicle, and charge the main battery during the wheel idling to extend the cruising range, by using the configuration of the wheel motor, planetary gear assembly, and the wheel. The range-extending, charging, and driving apparatus can further comprise the air compressor, which is connected to the wheel motor. When the wheel motor does work or reversely generate electric power to charge the main battery and drive the air compressor to compress air, the compressed air, used as fuel (including oxygen), is provided to the fuel cell, which can be used to charge the main battery, so as to extend the cruising range. The operation time of electric power of the electric vehicle is thus extended, thus resulting in the reduction of number of times for searching for charging stations for charging.

For better understanding of the above and other aspects of the invention, a plurality of embodiments or examples will be taken with accompanying drawings to provide detailed description as follows.

DETAILED DESCRIPTION

According to the invention, a range-extending, charging, and driving apparatus is provided for use in an electric vehicle, especially fuel cell electric vehicles. As will be illustrated in various embodiments, the range-extending, charging, and driving apparatus can be employed to extend the cruising range of and charging an electric vehicle, or can be employed to extend the cruising range, to enhance the torque, speed, and to extend the operation time of electric power of an electric vehicle. The range-extending, charging, and driving apparatus can be utilized in a variety of electric vehicles, for examples, electric vehicles with a driving energy source using a main battery and a fuel cell, such as electric cars, electric trucks, electric motorcycles, electric bicycles, and so on. Further, the invention is not limited thereto, and the electric vehicles for the invention can cover different kinds of electric vehicles: pure battery-powered electric vehicles, hybrid electric vehicles (HEV), fuel cell electric vehicles (FCEV), hybrid battery and fuel-cell electric vehicles, range-extended electric vehicles such as range-extending electric vehicles with an internal combustion engine and a generator, fuel-cell range-extending electric vehicles, and electric motorcycles. The main battery, for example, is a lithium battery, or NiMH battery; the fuel cell, for example, the use of oxygen as a fuel of the fuel cell, or lithium, vanadium, zinc and other metal fuel cells, or methanol, a direct methanol fuel cell. However, the invention is not limited thereto.

Figure 1A:
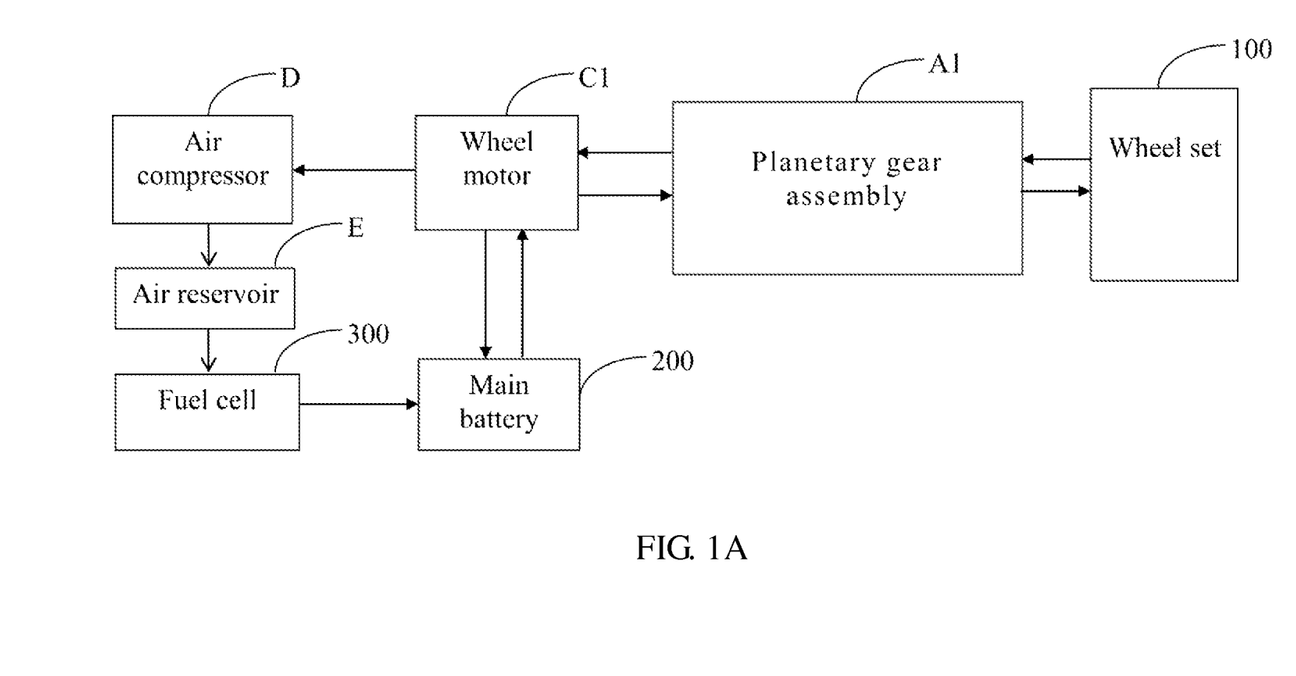
FIG. 1A is a block diagram illustrating a range-extending, charging, and driving apparatus for an electric vehicle, according to an embodiment of the invention.

According to a first embodiment of the invention, a range-extending, charging, and driving apparatus is provided for use in an electric vehicle. As shown in FIG. 1A, the apparatus comprises: a planetary gear assembly A1 and a wheel motor C1. The wheel motor C1, connected to the planetary gear assembly A1 corresponding to the wheel motor C1, is employed for driving the planetary gear assembly A1 and a wheel set 100 (which is connected to the planetary gear assembly A1) of wheels of the electric vehicle. The wheel motor C1 is further connected to a main battery 200 of the electric vehicle, and employed for charging the main battery 200 when the wheel motor C1 in reverse generates electric power. When the wheel motor C1 is connected to and drives the planetary gear assembly A1, the wheel motor C1 does work on the planetary gear assembly A1, and the planetary gear assembly A1 drives the wheel set 100 to turn; when the wheel motor C1 is connected to but does not drive the planetary gear assembly A1, the wheel set 100, which idles, reversely drives the planetary gear assembly A1, and the planetary gear assembly A1 reversely drives the wheel motor C1 to reversely generate electric power so as to charge the main battery 200.

In a second embodiment of the invention, the range-extending, charging, and driving apparatus for an electric vehicle further comprises: an air compressor D and an air reservoir E, as illustrated in FIG. 1A. The air compressor D is connected to the wheel motor C1, when the wheel motor C1 does work or reversely generates electric power so as to charge the main battery 200, the air compressor D is driven by the wheel motor C1 to compress air and the compressed air, utilized as fuel, is provided to a fuel cell, wherein the fuel cell is electrically coupled to the main battery 200, and employed for charging the main battery 200. The air reservoir E is fluidly coupled or connected to the air compressor D, for storing the air compressed by the air compressor D.

The above-mentioned wheel set 100 represents at least one wheel of an electric vehicle. For instance, the wheel set 100 can be at least one front wheel of the electric vehicle, or the wheel set 100 can be at least one rear wheel of the electric vehicle. The two embodiments of the range-extending, charging, and driving apparatus can be implemented as electric vehicles such as electric motorcycles or bicycles, equipped with two wheels, three wheels, or more wheels. For examples, one of the above two embodiments of the range-extending, charging, and driving apparatus is implemented in a rear wheel set (or front wheel set) of an electric motorcycle or bicycle.

In addition, the two embodiments of the range-extending, charging, and driving apparatus can be utilized in electric vehicles equipped with three or more wheels, such as electric cars or trucks. In an example, each of four wheels (regarded as four different wheel set 100) of an electric vehicle is equipped with one of the above two embodiments of the range-extending, charging, and driving apparatus. Similarly, electric cars with six or eight wheels, for example, can be also configured using one of the two embodiments as above. Further, for instance, in an implementation of an electric vehicle, the range-extending, charging, and driving apparatus can be configured for a plurality of left rear wheels that are regarded as a wheel set, and for a plurality of right rear wheels that are regarded as another wheel set. By referring to above examples of configuration of the apparatus, the apparatus can be also configured to be employed in another implementation with a plurality of left front wheels and a plurality of right front wheels. As for the wheel motor(s), for example, the wheel motors can be, or implemented by using, axial-flux motors, axial-flux permanent magnet motors, permanent magnet reluctance motors, brushless DC motors, radial-type brushless DC motors, disc-type brushless DC motors, disc-type axial-flux brushless DC motors, or slotless axial-flux permanent magnet motors; but the invention is not limited thereto, any other suitable motors can be utilized for implementation according to the invention.

In addition, an electric vehicle can be configured to extend the cruising range, to enhance the torque, speed of the electric vehicle, and to charge the main battery when wheels of the electric vehicle idle so as to achieve cruising range extension, by utilizing various configurations of the wheel motor(s) and planetary gear assembly(ies) with the wheel set(s) in the range-extending, charging, and driving apparatus, as illustrated in one of the two embodiments. For illustration purpose, some embodiments are provided as follows.

Figure 1B:
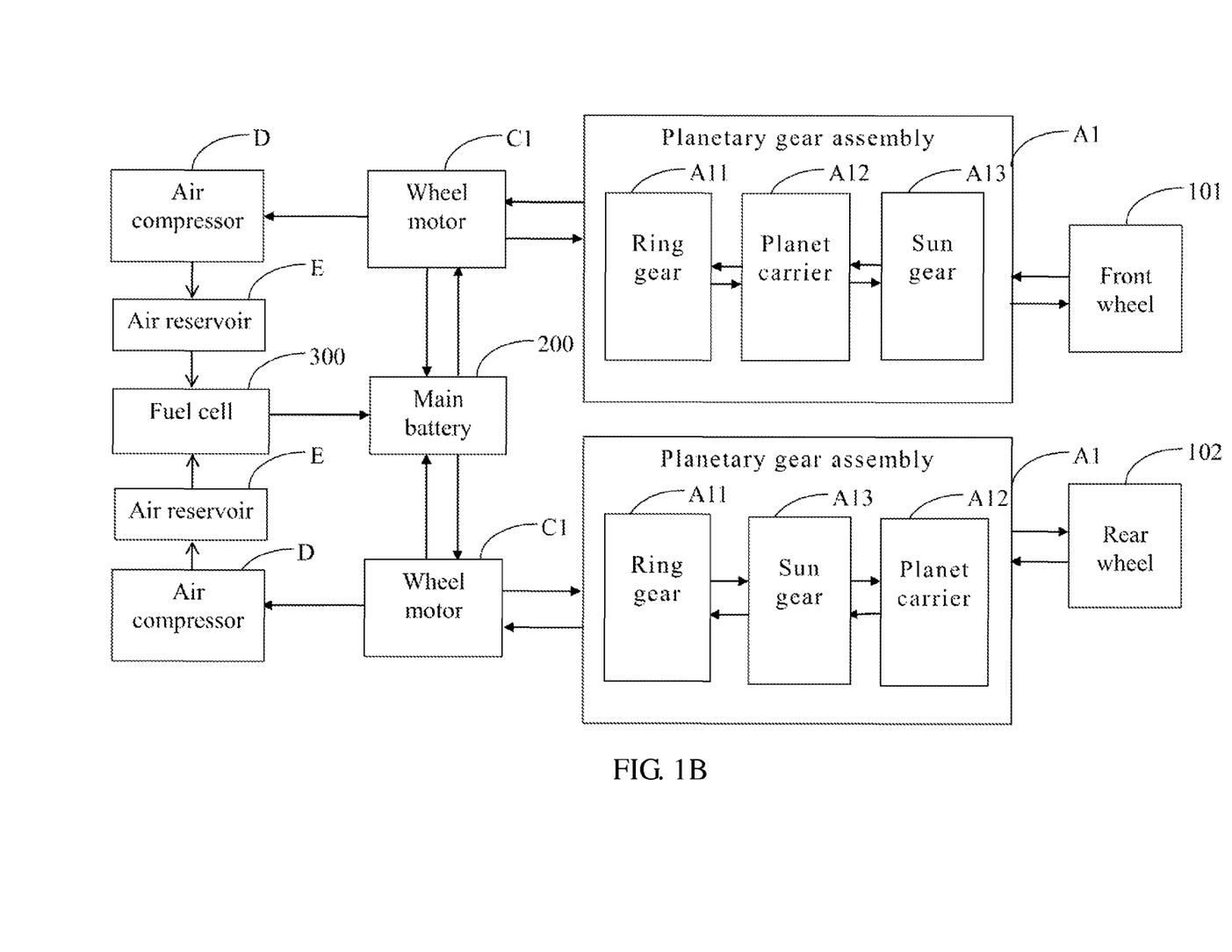
FIG. 1B is a block diagram illustrating a range-extending, charging, and driving apparatus for an electric vehicle, according to an embodiment of the invention.
Figure 2:
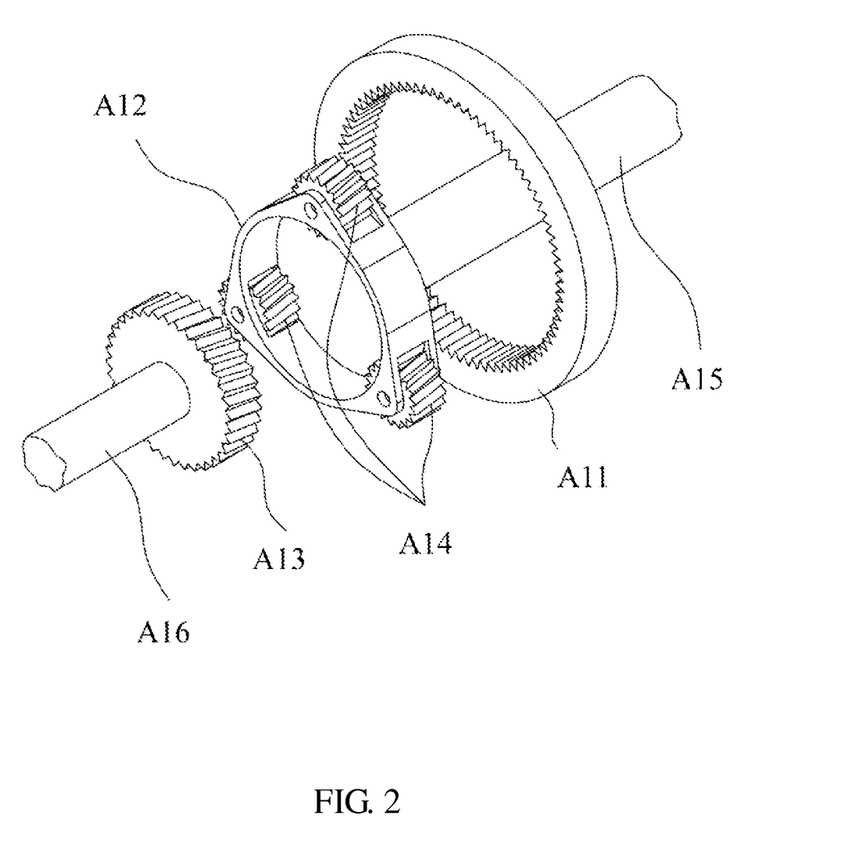
FIG. 2 is a schematic diagram illustrating an embodiment for the range-extending, charging, and driving apparatus for an electric vehicle, according to the invention.

Referring to both FIGS. 1B and 2, a range-extending, charging, and driving apparatus for an electric vehicle is illustrated in a block diagram form. In this embodiment, the range-extending, charging, and driving apparatus for an electric vehicle comprises a planetary gear assembly A1, a wheel motor C1, a fuel cell 300, and an air compressor D. For instance, two or more wheels of the electric vehicle, such as a front wheel 101, a rear wheel 102, can be connected to their corresponding planetary gear assemblies A1. The planetary gear assembly A1 is connected to the wheel motor C1. The wheel motor C1 is connected to the air compressor D and the main battery 200. The air compressor D can provide compressed air as fuel for the fuel cell 300 by the operation in the range-extending, charging, and driving apparatus. In addition, the fuel cell 300 can be employed to charge the main battery 200. In this embodiment, the electric vehicle utilizes the main battery 200 and fuel cell 300 to supply electric power for driving the wheels.

As illustrated in FIG. 2, the planetary gear assembly A1 includes a planetary gear A14, a planet carrier unit, a ring gear A11, and a sun gear unit. For example, the planet carrier unit includes at least a planet carrier A2 and a planet carrier shaft A15; the sun gear unit includes a sun gear A13 and a sun gear shaft A16. The planet carrier A12 of the planetary gear assembly A1 carries the planet carrier shaft A15. The planetary gear A14 of the planetary gear assembly A1 is disposed around within the ring gear A11, supported and positioned by the planet carrier A12. The sun gear shaft A16 is disposed one side of the sun gear A13, and the sun gear A13 is disposed inside the planetary gear A14, such that the sun gear A13 and the planetary gear A14 can mutually interact. In addition, at least one wheel (i.e., a wheel set) and a wheel motor C1 can be configured with one or more of planetary gear assemblies A1.

The wheel motor C1 is connected to the planetary gear assembly A1 to further drive the wheel(s). When the wheel motor C1 drives the planetary gear assembly A1, the wheel motor C1 does work on the planetary gear assembly A1, and the planetary gear assembly A1 then drives the wheel(s) to turn, one of the configurations as indicated below can be selected: (1) when the wheel motor C1 is connected to and drives the sun gear shaft A16, the sun gear A13 is then connected to and drives the planet carrier A12, and the planet carrier shaft A15 is then connected to and drives the rear wheel 102, the sun gear A13 is as an input, the planet carrier A12 is as an output, and the ring gear A11 is held, providing a large speed reduction in same direction at the rear wheel to result in a torque increase at the rear wheel; (2) when the wheel motor C1 is connected to and drives the planet carrier shaft A15, the planet carrier A12 is then connected to and drives the sun gear A13, and the sun gear shaft A16 is then connected to and drives the front wheel 101, the planet carrier A12 is as an input, the sun gear A13 is as an output, and the ring gear A11 is held, providing a large speed increase in same direction at the front wheel, enhancing speed of the electric vehicle. In addition, (3) When the wheel motor C1 is connected to and drives the planet carrier shaft A15, the planet carrier A12 is then connected to and drives the sun gear A13, and the sun gear shaft A16 is then connected to and drives the rear wheel 102, the planet carrier A12 is as an input, the sun gear A13 is as an output, and the ring gear A11 is held, providing a large speed increase in same direction at the rear wheel, enhancing speed of the electric vehicle; (4) when the wheel motor C1 is connected to and drives the sun gear shaft A16, the sun gear A13 is then connected to and drives the planet carrier A12, the planet carrier shaft A15 is then connected to and drives the front wheel 101, the sun gear A13 is as an input, the planet carrier A12 is as an output, and the ring gear A11 is held, providing a large speed reduction in same direction at the front wheel set to result in a torque increase at the front wheel. Accordingly, in some embodiments, the examples of configurations can be selected or combined in different ways for the implementation of operation of the electric vehicle.

In some embodiments, (1) the planetary gear assembly A1 is installed in an upright manner, which indicates that the wheel motor C1 is connected to the sun gear shaft A16, the planet carrier shaft A15 is connected to the wheel, providing a large speed reduction in same direction at the wheel to result in a torque increase at the wheel; (2) the planetary gear assembly A1 is installed in an inverted manner, which indicates that the wheel motor C1 is connected to the planet carrier shaft A15, the sun gear shaft A16 is connected to the wheel, providing a large speed increase in same direction at the wheel to enhance speed of the electric vehicle.

When the wheel motor C1 is connected to but does not drive the planetary gear assembly A1, the wheel which idles reversely drives the planetary gear assembly A1, and the planetary gear assembly A1 reversely drives the wheel motor C1 to reversely generate electric power, so as to charge the main battery 200. The planetary gear assembly A1 can then operate in one of the following configurations: (1) when the front wheel 101 idles and the front wheel 101 is connected to and drives the sun gear shaft A16, the sun gear A13 is then connected to and drives the planet carrier A12, the planet carrier shaft A15 is then connected to and drives the wheel motor C1 to generate electric power, the ring gear A11 is held, the sun gear A13 is as an input, and the planet carrier A12 is as an output, making the planetary gear assembly A1 achieve a large speed reduction in same direction to charge the main battery 200; (2) when the rear wheel 102 idles and the rear wheel 102 is connected to and drives the planet carrier shaft A15, the planet carrier A12 is then connected to and drives the sun gear A13, the sun gear shaft A16 is then connected to and drives the wheel motor C1 to generate electric power, the ring gear A11 is held, the planet carrier A12 is as an input, and the sun gear A13 is as an output, making the planetary gear assembly A1 achieve a large speed increase in same direction to charge the main battery 200. In addition, one of the following configurations can be selected: (3) when the front wheel 101 idles and the front wheel 101 is connected to and drives the planet carrier shaft A15, the planet carrier A12 is then connected to and drives the sun gear A13, the sun gear shaft A16 is then connected to and drives the wheel motor C1 to generate electric power, the ring gear A11 is held, the planet carrier A12 is as an input, and the sun gear A13 is as an output, making the planetary gear assembly A1 achieve a large speed increase in same direction to charge the main battery 200; (4) when the rear wheel 102 idles and the rear wheel 102 is connected to and drives the sun gear shaft A16, the sun gear A13 is then connected to and drives the planet carrier A12, and the planet carrier shaft A15 is then connected to and drives the wheel motor C1 to generate electric power, the ring gear A11 is held, the sun gear A13 is as an input, and the planet carrier A12 is as an output, making the planetary gear assembly A1 achieve a large speed reduction in same direction to charge the main battery 200. Accordingly, in some embodiments, the examples of configurations can be selected or combined in different ways for the implementation of operation of the electric vehicle.

In some embodiments, a plurality of planetary gear assemblies A1 can be employed; one or a plurality of planetary gear assemblies A1 can be configured with at least one wheel (i.e., a wheel set) and a wheel motor C1; a plurality of planetary gears A14 can be also employed; and there is a spacing among adjacent ones of the planetary gears A14.

In addition, an outer shaft of the wheel motor C1, for example, is employed for driving the at least one planetary gear A14 of the planetary gear assembly A1 to do work, or is employed for being driven by planetary gear A14 of the planetary gear assembly A1 for generation of electric power. An inner shaft of the wheel motor C1 is connected to and drives the air compressor D. The air compressor D compresses the air to provide the compressed air as fuel for fuel cell 300. For example, the inner shaft of the wheel motor C1 is linked to a crankshaft so as to drive one or a plurality of pistons of an air cylinder of the air compressor D, so that the compressed air is used as fuel and provided to fuel cell 300. In an embodiment, the range-extending, charging, and driving apparatus can be configured with at least one air reservoir E for storing compressed air; the air reservoir E is fluidly coupled or connected to the air compressor D, the air reservoir E is employed for storing the air compressed by the air compressor D when the air compressor D is employed to compress air. For example, compressed air can be provided by the air reservoir E in which the compressed air is stored from after a piston of the air compressor D is driven. However, the invention is not limited thereto, and it is understood that any structure or configuration that can drive the air compressor D so as to provide compressed air can be also regarded as embodiments of the invention. In another embodiment, the main battery 200 can be charged by using fuel cell 300 which obtains the compressed air as fuel. Further, the invention is not limited to the way of connection or combinations of the wheel motor, the planetary gear assembly, and the wheel(s). In addition to the shaft-to-shaft connection among the wheel motor, the planetary gear assembly, and the wheel(s), in some embodiments, any two or all three of: the wheel motor, the corresponding planetary gear assembly, and a wheel of the wheel set are connected with zero distance. In other embodiments, any one or all of the wheel motor and the corresponding planetary gear assembly can be embedded into a wheel of the wheel set directly, or embedded into the wheel of the wheel set via at least one cushion/buffer/bumper. In yet other embodiments, any one or all of the wheel motor and the corresponding planetary gear assembly can be screwed into a wheel of the wheel set directly, or screwed into the wheel of the wheel set via at least one cushion/buffer/bumper. In still other embodiments, any one or all of the wheel motor and the corresponding planetary gear assembly can be joined to a wheel of the wheel set by latches/buckles/buttons, or joined to the wheel of the wheel set via at least one cushion/buffer/bumper by latches/buckles/buttons.

As illustrated above, the embodiments of the range-extending, charging, and driving apparatus for an electric vehicle can effectively extend the cruising range of an electric vehicle, and charge main battery 200 by using the wheel(s) idling. In addition, some embodiments can further enhance the torque, and speed. Some embodiments can further provides air (where oxygen is included) as fuel for fuel cell 300, which can be utilized for charging main battery 200, thus further extending the operation time of electric power of an electric vehicle. Thus, the range-extending, charging, and driving apparatus can achieve a reduced number of times for charging the electric vehicle. The users of electric vehicles can then save the time for finding charging stations, and obtain better usage experience, thus enhancing user acceptance of the electric vehicles.

Figure 3:
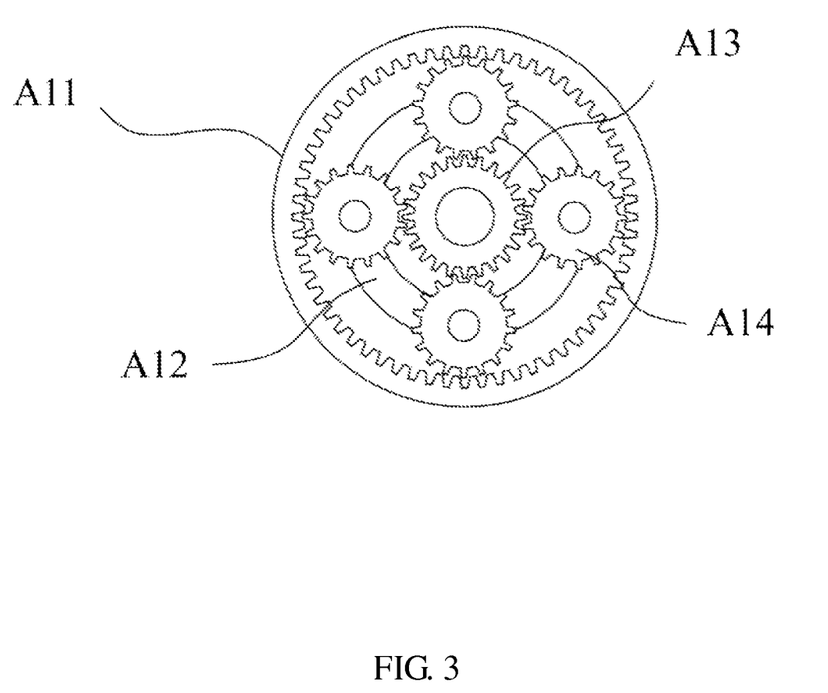
FIGS. 3 to 6 are block diagrams illustrating various embodiments for the range-extending, charging, and driving apparatus for an electric vehicle, according to the invention.
Figure 4:
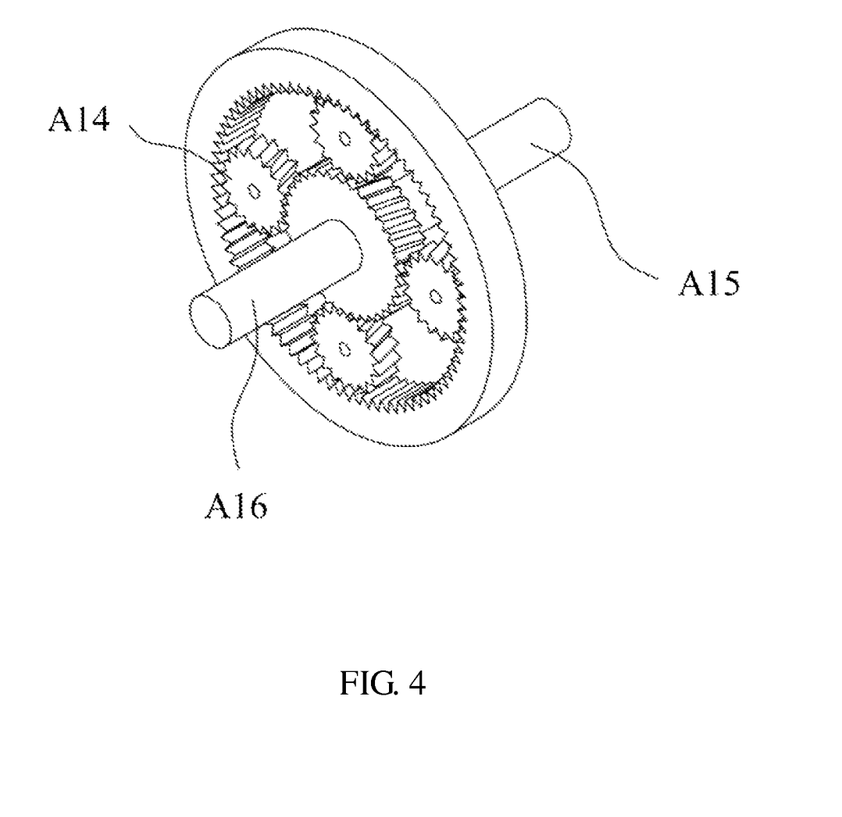
Figure 5:
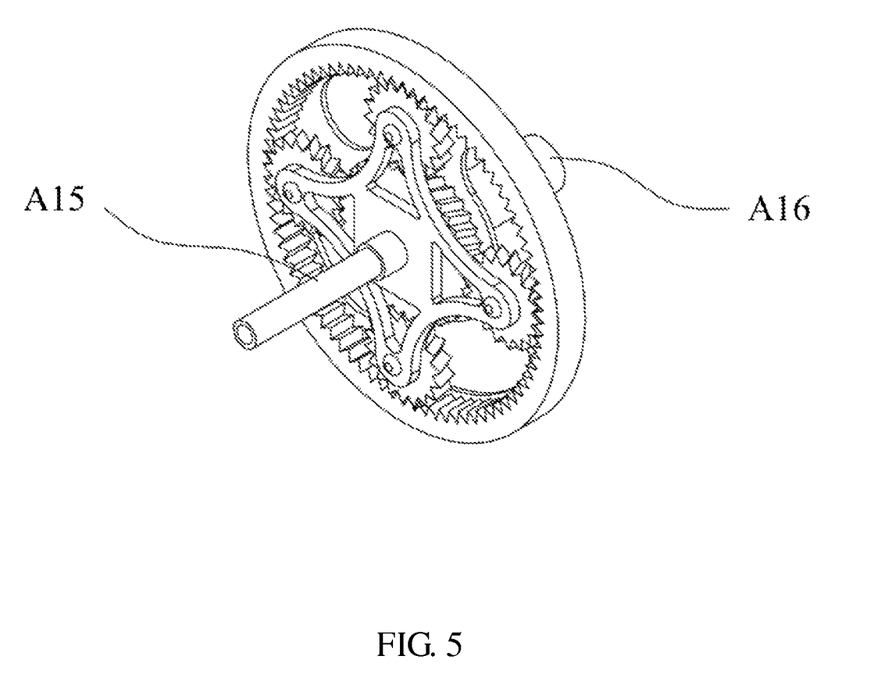
Figure 6:
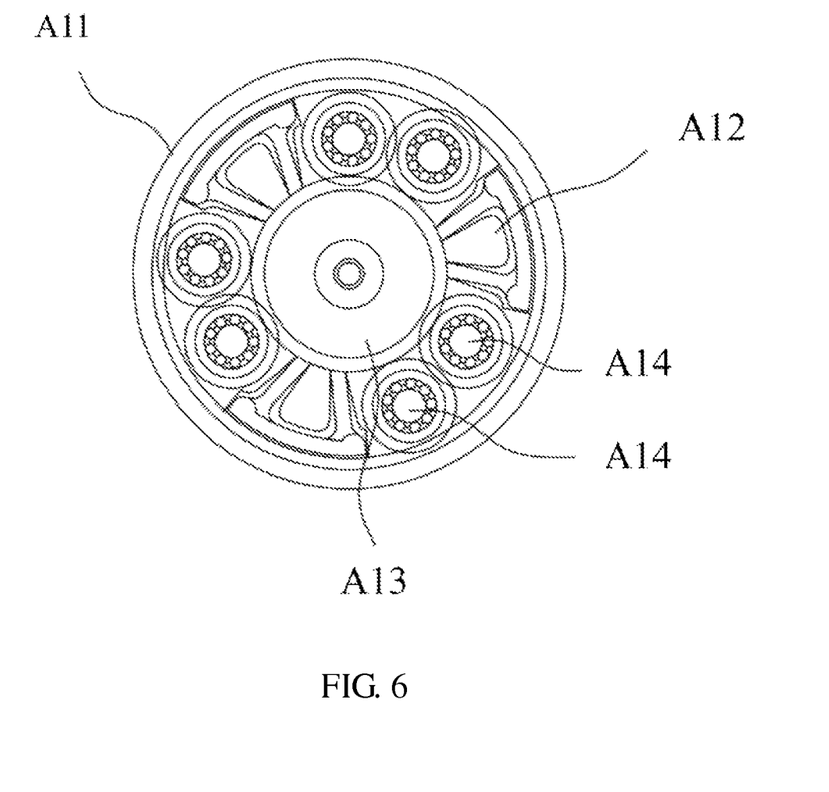

FIGS. 3 to 6 illustrate other embodiments of the range-extending, charging, and driving apparatus. In FIGS. 3 to 5, planetary gear assembly has four planetary gears A14. In FIG. 6, there is a plurality of arrays of planetary gears A14, and a spacing exists among adjacent ones of the planetary gear arrays, and each planetary gear array may have two or more planetary gears A14 engaged with each other.

To sum up, various configurations are indicated in the following.

1. When a wheel motor drives a planetary gear assembly, the wheel motor does work on the planetary gear assembly, and the planetary gear assembly then drives the wheel(s) to turn, one of the configurations can be then selected. (1) To obtain a torque increase, a large speed reduction in same direction is achieved at the rear wheel(s) by that the ring gear is held, the sun gear is as an input, and the planet carrier is as an output, during the front wheel(s) idling for generation of electric power; or (2) to enhance speed of the electric vehicle, a large speed increase in same direction is achieved at the front wheel(s) by that the ring gear is held, the sun gear is as an output, and the planet carrier is as an input, during the rear wheel(s) idling for generation of electric power. In addition, one of the following can be selected: (3) to enhance speed of the electric vehicle, a large speed increase in same direction is achieved at the rear wheel(s) by that the ring gear is held, the sun gear is as an output, and the planet carrier is as an input, during the front wheel(s) idling for generation of electric power; or (4) to obtain a torque increase, a large speed reduction in same direction is achieved at the front wheel(s) by that the ring gear is held, the sun gear is as an input, and the planet carrier is as an output, during the rear wheel(s) idling for generation of electric power.

2. When the wheel motor does not drive planetary gear assembly, the idle wheel drives the planetary gear assembly, the planetary gear assembly drives the wheel motor in reverse for generation of electric power, and the planetary gear assembly can then operate in one of the configurations: (1) during the front wheel(s) idling for generation of electric power, a large speed reduction in same direction is achieved at the planetary gear assembly for the front wheel(s) by that the ring gear is held, the sun gear is as an input, and the planet carrier is as an output; or (2) during the rear wheel(s) idling for generation of electric power, a large speed increase in same direction is achieved at the planetary gear assembly for the rear wheel(s) by that the ring gear is held, the sun gear is as an output, and the planet carrier is as an input. In addition, the planetary gear assembly can operate in one of the configurations: (3) during the front wheel(s) idling for generation of electric power, a large speed increase in same direction is achieved at the planetary gear assembly for the front wheel(s) by that the ring gear is held, the sun gear is as an output, and the planet carrier is as an input; or (4) during the rear wheel(s) idling for generation of electric power, a large speed reduction in same direction is achieved at the planetary gear assembly for the rear wheel(s) by that the ring gear is held, the sun gear is as an input, and the planet carrier is as an output.

3. An outer shaft of a wheel motor: when the planetary gear is driven to do work, or when the planetary gear is driven for generation of electric power, an inner shaft of the wheel motor is connected to and drives the air compressor D to compress air, so that the compressed air (with oxygen), used as fuel, can be supplied to the fuel cell 300, which can serve as an electric power source and/or can charge the main battery 200.

It will be apparent to those skilled in the art that various modifications and variations can be made to the present disclosure without departing from the spirit and scope of the disclosure. Thus it is intended that the present disclosure cover the modifications and variations of this disclosure provided they come within the scope of the appended claims and their equivalents.

What is claimed is:

1. A range-extending, charging, and driving apparatus for an electric vehicle, the apparatus comprising:
   a planetary gear assembly, including at least one planetary gear, a planet carrier unit, a ring gear, and a sun gear unit; and
   a wheel motor, connected to the corresponding planetary gear assembly, for driving the planetary gear assembly and a wheel set, connected to the planetary gear assembly, of a plurality of wheels of the electric vehicle, the wheel motor further connected to a main battery, for charging the main battery when the wheel motor generates electric power reversely;
   wherein when the wheel motor is connected to and drives the planetary gear assembly, the wheel motor does work on the planetary gear assembly, and the planetary gear assembly drives the wheel set to turn;
   wherein when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery; and
   wherein the planet carrier unit comprises a planet carrier and a planet carrier shaft, the sun gear unit comprises a sun gear and a sun gear shaft; when the wheel motor is connected to and drives the planet carrier shaft, the planet carrier is then connected to and drives the sun gear, the sun gear shaft is then connected to and drives the wheel set, the planet carrier is as an input, the sun gear is as an output, and the ring gear is held, providing a large speed increase in same direction at the wheel set to enhance speed of the electric vehicle, wherein the wheel set has at least one front wheel of the electric vehicle.

2. The range-extending, charging, and driving apparatus for the electric vehicle according to claim 1, wherein the range-extending, charging, and driving apparatus comprises a plurality of the planetary gear assemblies, the planetary gear assembles are configured with at least the wheel set of the wheels and the wheel motor.

3. The range-extending, charging, and driving apparatus for the electric vehicle according to claim 1, wherein the at least one planetary gear indicates a plurality of planetary gears, and there is a spacing among adjacent ones of the planetary gears.

4. The range-extending, charging, and driving apparatus for the electric vehicle according to claim 1, wherein the at least one planetary gear indicates a plurality of planetary gear arrays, there is a spacing among adjacent ones of the planetary gear arrays, the planetary gears in each of the planetary gear arrays are engaged.

5. The range-extending, charging, and driving apparatus for the electric vehicle according to claim 1, wherein the range-extending, charging, and driving apparatus comprises a plurality of the planetary gear assemblies and a plurality of the wheel motors, wherein one of the wheel motors is configured to drive one of the planetary gear assemblies and a left wheel set connected thereto; another of the wheel motor is configured to drive another of the planetary gear assemblies and a right wheel set connected thereto, the left wheel set and the right wheel set are front wheels of the electric vehicle.

6. The range-extending, charging, and driving apparatus for an electric vehicle according to claim 1, wherein any two or all of: the wheel motor, the corresponding planetary gear assembly, and a wheel of the wheel set are connected with zero distance.

7. The range-extending, charging, and driving apparatus for an electric vehicle according to claim 1, wherein any one or all of the wheel motor and the corresponding planetary gear assembly is embedded into, screwed into, or joined to a wheel of the wheel set.

8. A range-extending, charging, and driving apparatus for an electric vehicle, the apparatus comprising:
   a planetary gear assembly, including at least one planetary gear, a planet carrier unit, a ring gear, and a sun gear unit; and
   a wheel motor, connected to the corresponding planetary gear assembly, for driving the planetary gear assembly and a wheel set, connected to the planetary gear assembly, of a plurality of wheels of the electric vehicle, the wheel motor further connected to a main battery, for charging the main battery when the wheel motor generates electric power reversely;
   wherein when the wheel motor is connected to and drives the planetary gear assembly, the wheel motor does work on the planetary gear assembly, and the planetary gear assembly drives the wheel set to turn;
   wherein when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery; and
   wherein the planet carrier unit comprises a planet carrier and a planet carrier shaft, the sun gear unit comprises a sun gear and a sun gear shaft; when the wheel motor is connected to and drives the planet carrier shaft, the planet carrier is then connected to and drives the sun gear, the sun gear shaft is then connected to and drives the wheel set, the planet carrier is as an input, the sun gear is as an output, and the ring gear is held, providing a large speed increase in same direction at the wheel set to enhance speed of the electric vehicle, wherein the wheel set has at least one rear wheel of the electric vehicle.

9. The range-extending, charging, and driving apparatus for the electric vehicle according to claim 8, wherein the range-extending, charging, and driving apparatus comprises a plurality of the planetary gear assemblies and a plurality of the wheel motors, wherein one of the wheel motors is configured to drive one of the planetary gear assemblies and a left wheel set connected thereto; another of the wheel motor is configured to drive another of the planetary gear assemblies and a right wheel set connected thereto, the left wheel set and the right wheel set are rear wheels of the electric vehicle.

10. A range extending, charging, and driving apparatus for an electric vehicle, the apparatus comprising:
    a planetary gear assembly, including at least one planetary gear, a planet carrier unit, a ring gear, and a sun gear unit; and a wheel motor, connected to the corresponding planetary gear assembly, for driving the planetary gear assembly and a wheel set, connected to the planetary gear assembly, of a plurality of wheels of the electric vehicle, the wheel motor further connected to a main battery, for charging the main battery when the wheel motor generates electric power reversely;

wherein when the wheel motor is connected to and drives the planetary gear assembly, the wheel motor does work on the planetary gear assembly, and the planetary gear assembly drives the wheel set to turn;

wherein when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery; and wherein the planet carrier unit comprises a planet carrier and a planet carrier shaft, the sun gear unit comprises a sun gear and a sun gear shaft; when the wheel set idles and the wheel set is connected to and drives the sun gear shaft, the sun gear is then connected to and drives the planet carrier, and the planet carrier shaft is then connected to and drives the wheel motor to generate electric power, the ring gear is held, the sun gear is as an input, and the planet carrier is as an output, making the planetary gear assembly achieve a large speed reduction to charge the main battery, wherein the wheel set has at least one front wheel of the electric vehicle.

11. The range-extending, charging, and driving apparatus for an electric vehicle according to claim 10, wherein the range-extending, charging, and driving apparatus comprises a plurality of the planetary gear assemblies and a plurality of the wheel motors, wherein a left wheel set, which idles, drives one of the planetary gear assemblies and one of the wheel motors connected thereto, so as to charge the main battery; a right wheel set, which idles, drives another of the planetary gear assemblies and another of the wheel motors connected thereto, so as to charge the main battery, the left wheel set and the right wheel set are front wheels of the electric vehicle.

12. A range-extending, charging, and driving apparatus for an electric vehicle, the apparatus comprising:

a planetary gear assembly, including at least one planetary gear, a planet carrier unit, a ring gear, and a sun gear unit; and a wheel motor, connected to the corresponding planetary gear assembly, for driving the planetary gear assembly and a wheel set, connected to the planetary gear assembly, of a plurality of wheels of the electric vehicle, the wheel motor further connected to a main battery, for charging the main battery when the wheel motor generates electric power reversely;

wherein when the wheel motor is connected to and drives the planetary gear assembly, the wheel motor does work on the planetary gear assembly, and the planetary gear assembly drives the wheel set to turn;

when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery;

wherein the planet carrier unit comprises a planet carrier and a planet carrier shaft, the sun gear unit comprises a sun gear and a sun gear shaft; when the wheel set idles and the wheel set is connected to and drives the sun gear shaft, the sun gear is then connected to and drives the planet carrier, and the planet carrier shaft is then connected to and drives the wheel motor to generate electric power, the ring gear is held, the sun gear is as an input, and the planet carrier is as an output, making the planetary gear assembly achieve a large speed reduction to charge the main battery, wherein the wheel set has at least one rear wheel of the electric vehicle.

13. The range-extending, charging, and driving apparatus for an electric vehicle according to claim 12, wherein the range-extending, charging, and driving apparatus comprises a plurality of the planetary gear assemblies and a plurality of the wheel motors, wherein a left wheel set, which idles, drives one of the planetary gear assemblies and one of the wheel motors connected thereto, so as to charge the main battery; a right wheel set, which idles, drives another of the planetary gear assemblies and another of the wheel motors connected thereto, so as to charge the main battery, the left wheel set and the right wheel set are rear wheels of the electric vehicle.

14. A range-extending, charging, and driving apparatus for an electric vehicle, the apparatus comprising:

a planetary gear assembly, including at least one planetary gear, a planet carrier unit, a ring gear, and a sun gear unit; and a wheel motor, connected to the corresponding planetary gear assembly, for driving the planetary gear assembly and a wheel set, connected to the planetary gear assembly, of a plurality of wheels of the electric vehicle, the wheel motor further connected to a main battery, for charging the main battery when the wheel motor generates electric power reversely, wherein when the wheel motor is connected to and drives the planetary gear assembly, the wheel motor does work on the planetary gear assembly, and the planetary gear assembly drives the wheel set to turn, and when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery;

an air compressor, connected to the wheel motor, wherein when the wheel motor does work or reversely generates electric power to charge the main battery, the air compressor is driven by the wheel motor to compress air, and the compressed air, utilized as fuel, is provided to a fuel cell capable of being a power source, wherein the fuel cell is coupled to the main battery, and is utilized for charging the main battery; and an air reservoir, fluidly coupled to the air compressor, for storing the air compressed by the air compressor.

15. The range-extending, charging, and driving apparatus for an electric vehicle according to claim 14, wherein an outer shaft of the wheel motor is employed for driving the at least one planetary gear of the planetary gear assembly to do work, or for being driven by the planetary gear for generation of electric power; and an inner shaft of the wheel motor is employed for driving the air compressor, wherein the compressed air is used as fuel and provided to the fuel cell.

16. The range-extending, charging, and driving apparatus for an electric vehicle according to claim 15, wherein the inner shaft of the wheel motor is linked to a crankshaft to drive at least one piston of an air cylinder of the air compressor, wherein the compressed air is used as fuel and provided to the fuel cell.

\* \* \* \* \*